(12) United States Patent
Mishkevich et al.

(10) Patent No.: US 7,323,868 B2
(45) Date of Patent: Jan. 29, 2008

(54) SYSTEM AND METHOD FOR TEMPERATURE INDEPENDENT MEASUREMENT OF STANDOFF DISTANCE USING AN EDDY CURRENT SENSOR

(75) Inventors: Victor G. Mishkevich, Bridgewater, NJ (US); Douglas R. Browning, Denville, NJ (US); Richard T. Gieske, Newton, NJ (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 0 days.

(21) Appl. No.: 11/230,930

(22) Filed: Sep. 21, 2005

(65) Prior Publication Data

US 2007/0063697 A1  Mar. 22, 2007

(51) Int. Cl.
  *G01N 27/72* (2006.01)
(52) U.S. Cl. .................................. 324/239; 324/207.11
(58) Field of Classification Search .................. 452/52, 452/198; 119/14.02, 14.01, 14.03; 324/228, 324/239, 207.11
  See application file for complete search history.

(56) References Cited

U.S. PATENT DOCUMENTS

| | | | |
|---|---|---|---|
| 3,936,734 A | 2/1976 | Brandli et al. | |
| 4,095,469 A | 6/1978 | Yamada et al. | |
| 4,173,869 A | 11/1979 | Martin, Jr. et al. | |
| 4,408,294 A | 10/1983 | Imdad | |
| 4,460,869 A | 7/1984 | Buser et al. | |
| 4,468,968 A | 9/1984 | Kee | |
| 4,821,204 A | 4/1989 | Huschelrath | |
| 4,970,670 A | 11/1990 | Twerdochlib | |
| 4,987,555 A | 1/1991 | Twerdochlib | |
| 5,140,264 A | 8/1992 | Metala et al. | |
| 5,206,816 A | 4/1993 | Hill et al. | |
| 5,226,731 A | 7/1993 | Allen | |
| 5,258,923 A | 11/1993 | Imam et al. | |
| 5,371,462 A | 12/1994 | Hedengren et al. | |
| 5,502,999 A | 4/1996 | Seberger et al. | |
| 5,596,271 A | 1/1997 | Lowery | |
| 5,698,977 A | 12/1997 | Simpson et al. | |
| 5,808,202 A | 9/1998 | Passarelli, Jr. | |
| 6,094,989 A | 8/2000 | Twerdochlib | |
| 6,346,807 B1 | 2/2002 | Slates | |
| 6,594,619 B1 | 7/2003 | von Flotow | |
| 6,629,463 B2 | 10/2003 | Naudet et al. | |
| 6,657,429 B1 | 12/2003 | Goldfine et al. | |
| 6,661,222 B1 | 12/2003 | Twerdochlib | |
| 6,664,782 B2 | 12/2003 | Slates | |
| 6,692,222 B2 | 2/2004 | Prinz et al. | |
| 6,785,635 B2 | 8/2004 | von Flotow | |
| 6,879,404 B2 * | 4/2005 | Jagiella et al. .............. 356/614 |
| 2002/0019708 A1 | 2/2002 | Pross | |
| 2003/0060986 A1 | 3/2003 | Flotow | |
| 2003/0071615 A1 | 4/2003 | Schlicker et al. | |
| 2004/0066188 A1 | 4/2004 | Goldfine et al. | |

* cited by examiner

*Primary Examiner*—Reena Aurora
(74) *Attorney, Agent, or Firm*—Steptoe & Johnson

(57) ABSTRACT

An embodiment of the invention generally relates to a temperature-independent method of determining an engine health parameter, namely stand-off distance, between an eddy current sensor and a conductive element. The method includes receiving a signal from the eddy current sensor and demodulating a waveform from the received signal. The method also includes determining a predetermined set of substantially temperature-independent parameters from the waveform and determining the stand-off distance based on the predetermined set of substantially temperature-independent parameters.

23 Claims, 5 Drawing Sheets

SYSTEM AND METHOD FOR TEMPERATURE INDEPENDENT MEASUREMENT OF STANDOFF DISTANCE USING AN EDDY CURRENT SENSOR

GOVERNMENT RIGHTS

The government has certain rights in this invention pursuant to Contract No. N00019-02-C-3003 awarded by the Department of the Navy.

FIELD OF THE INVENTION

This invention relates to eddy current sensors, and particularly to eddy current sensors used in diagnostics and health management systems for measuring various parameters of moving, electrically conductive objects.

BACKGROUND OF THE INVENTION

Eddy current sensors are known and used in a variety of applications. One use of eddy current sensors is monitoring for defects in turbine blades of a turbine engine. More particularly, as a turbine blade spins in the turbine engine, the blade is affected by centrifugal forces. The constant centrifugal forces along with vibration may induce material defects in the turbine blade. As the material defects grow, the length of the turbine blade may increase incrementally and eventually meet the inner diameter of the turbine casing and thus cause damage to the turbine engine.

U.S. Pat. No. 5,942,893 (issued Aug. 24, 1999) to Terry ("'893 patent") discloses eddy current sensors for detecting various parameters, e.g. Blade tip clearance, speed and time of arrival of rotating blades of turbo machinery. The detected information is used for monitoring the performance and condition of the machinery.

The eddy current sensors disclosed in the '893 patent (the subject matter of which is incorporated herein by reference) comprise a generally E-shaped core having three parallel legs joined together by a bridge. The two outer legs include oppositely wound coils generating two high frequency magnetic fields which combine to form the sensing magnetic field. A third sensing coil is wound around the center leg of the E-shaped core and is connected to a signal processing circuit.

In the absence of any moving electrically conductive object within the magnetic sensing field produced by the two outer coils, the sensing field remains undisturbed and no voltages or signals are produced in the sensing coil. However, when an electrically conductive object, e.g., the rotating blade of a turbine, passes through the magnetic field, eddy currents are generated within the conductive object. The eddy currents themselves generate magnetic fields, and, as these eddy current produced magnetic fields interact with the sensing field, disturbances occur in the sensing field which induce signal voltages in the sensing coil on the center leg of the E-shaped core. The induced signal in the sensing coil, once demodulated, generates a waveform signal with negative and positive peaks and a zero crossing point.

Analysis of the induced coil signal, as described in the '893 patent, provides various information about the moving object, e.g., the speed of the object, its standoff distance from the sensor and the time of its passage by the two outer legs and the center leg of the sensor. As described in the patent, such information is useful for monitoring the operating characteristics of turbo machinery. As discussed above, the two outer coils are the drive coils producing the magnetic field. The two drive coils, however, do not necessarily need to be positioned on the outside of the eddy current sensor and may be positioned on the center coil with one of the outer coils being the sensing coil.

The traditional approach to the analysis of the coil signal, and particularly the standoff distance, includes calculating the standoff distance as a function of the peak-to-peak voltage between the negative and positive peaks of the demodulated waveform. In a properly designed eddy current sensor this voltage does not depend on rotating blades temperature. Unfortunately, magnitude of the waveform and this peak-to-peak voltage are sensitive to temperature and dependent on the temperature of the eddy current sensor and sensor electronic circuits. As such, additional temperature sensors and additional electronics are also necessary to measure the temperature of the sensors and sensor electronics in order to compensate for temperature variations. Temperature compensation algorithms and data also require significant processing capability to manage computing standoff distance as a function of both peak-to-peak voltage and the temperature of the sensor and sensor electronics.

Therefore, there exists a need for a method of computing standoff distance that is independent of the temperature of the eddy current sensor and the sensor electronics.

SUMMARY OF THE INVENTION

An embodiment of the invention generally relates to a temperature-independent method of determining an engine health parameter, namely stand-off distance between an eddy current sensor and a conductive element. The method includes receiving a signal from the eddy current sensor, demodulating, amplifying, and processing a waveform from the received signal. The method also includes establishing a predetermined set of substantially temperature-independent parameters from the waveform and determining the standoff distance from these temperature-independent parameters.

Another embodiment of the invention generally pertains to a method of monitoring the health of a rotating machine using eddy current sensors. The method includes receiving a plurality of signals from at least one eddy current sensor and demodulating a plurality of waveforms from the plurality signals. The method also includes determining a predetermined set of substantially temperature-independent parameters from each waveform of the plurality of waveforms and determining a plurality of standoff distances from the predetermined set of parameters, each standoff distance associated with a waveform. The method further includes determining the health of the rotating machine based on the plurality of standoff distances.

Yet another embodiment of the invention generally relates to a system for monitoring. The system includes an engine with a plurality of blades and at least one eddy current sensor mounted on the engine. The eddy current sensor is configured to monitor the blades of the engine. The system also includes a defect monitoring module configured to receive a signal from the at least one eddy current sensor. The defect monitoring module may be configured to determine a set of substantially temperature-independent parameters based on the signal and assess the defect of the engine based on the set of substantially temperature-independent parameters.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

For simplicity and illustrative purposes, the principles of the present invention are described by referring mainly to exemplary embodiments thereof. However, one of ordinary skill in the art would readily recognize that the same principles are equally applicable to, and may be implemented in, all types of monitoring systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally pertain to a system and method of monitoring for defects in rotating machines. More particularly, an eddy current sensor may be configured to be located near the rotating elements of the rotating machine, e.g., a blade, impeller, etc. The output of the eddy current sensor may be interfaced to an eddy current sensor electronic module to receive the signal from the eddy current sensor, demodulate, and amplify the received signal. The demodulated signal, or waveform signal, may then be received by a defect monitoring module. The defect monitoring module may be configured to determine a first peak voltage and a second peak voltage and the distance between the first and second voltage peaks as part of a set of temperature-independent parameters associated with the waveform. The defect monitoring module may be further configured to determine a standoff distance based on the distance between the first and second voltage peaks, e.g., peak-to-peak distance.

In some embodiments of the present invention, the defect monitoring module may use a predetermined calibration curve to compute the standoff distance. In other embodiments, the defect monitoring module may use a predetermined table of peak-to-peak distance versus standoff distance. Interpolation techniques may then be used to determine the value of the standoff distance. As would be obvious to those of skill in the art, the standoff distance, for example between the eddy current sensor and the turbine blades of an aircraft engine, may be used to determine certain health data of the aircraft engine. In accordance with one embodiment of the present invention, the standoff distance may be analyzed in real time to monitor the health of an aircraft engine. Alternatively, it should be understood that the standoff distance data may be stored and subsequently reviewed to determine the health of the aircraft engine.

Figure 1:
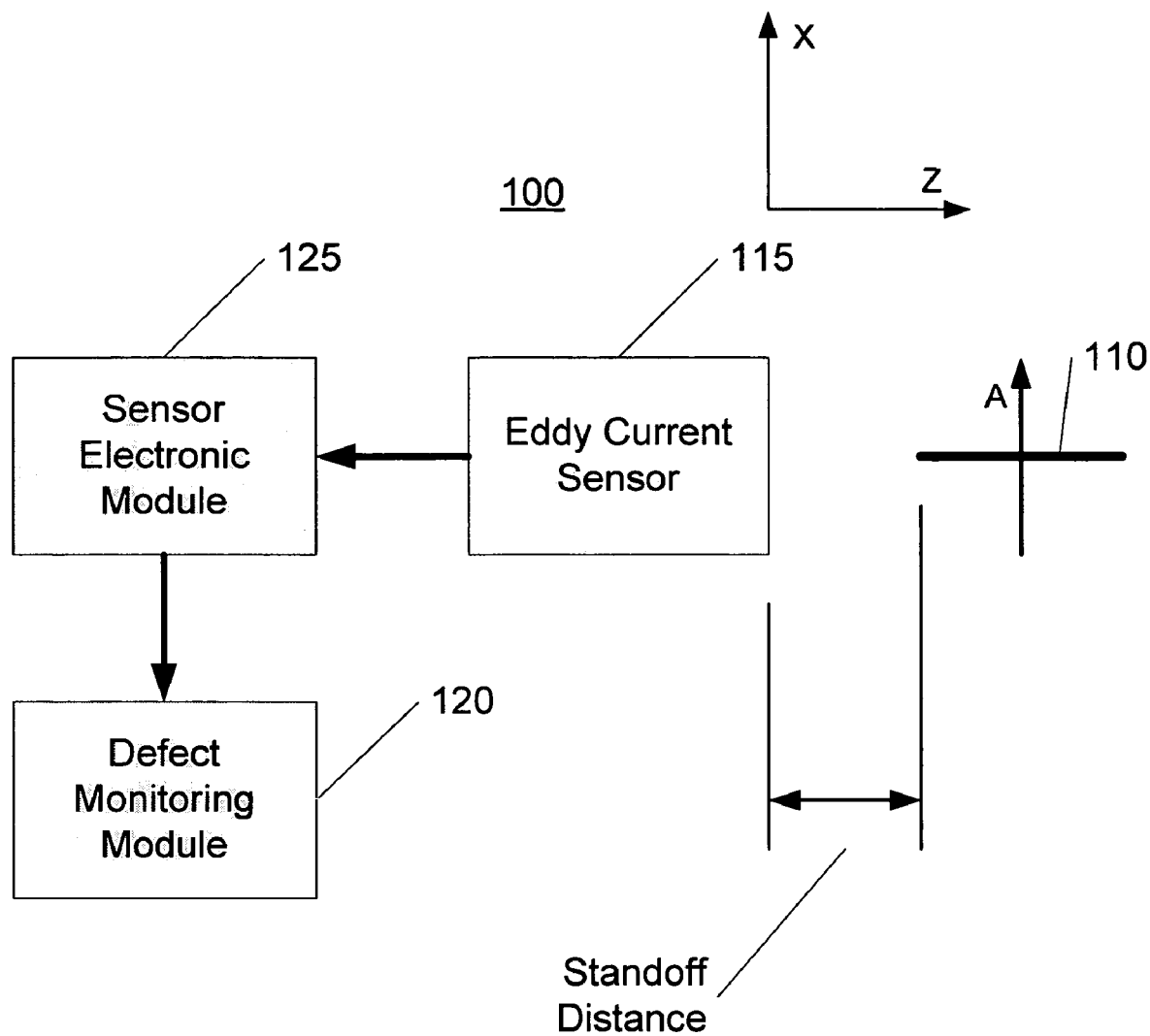
FIG. 1 illustrates a defect monitoring system in accordance with one embodiment of the invention.

FIG. 1 illustrates a system 100 in accordance with an embodiment. It should be readily apparent to those of ordinary skill in the art that the system 100 depicted in FIG. 1 represents a generalized schematic illustration and that other components may be added or existing components may be removed or modified.

As shown in FIG. 1, the system 100 includes a conductive element 110, an eddy current sensor 115, an eddy current sensor electronic module 125, and a defect monitoring system 120. In accordance with at least one embodiment of the present invention, the conductive element 110 may be a rotating turbine blade of an aircraft engine or other piece of a rotating machine and the eddy current sensor 115 may be used to measure the standoff distance between the eddy current sensor and the conductive element 110. The eddy current sensor may be mounted in the aircraft engine casing such that the turbine blades pass by the eddy current sensor. For example, for the monitoring of a blade of a jet engine, the sensor 115 may be typically located within the confines of the jet engine or extending through an opening in the side of the engine wall. It should be obvious to one of ordinary skill however that eddy current sensor may be employed on many other devices or rotating machines, such as other jet engines, a water turbines, a power generators, or other similar types of devices.

In FIG. 1, the conductive element 110 is shown passing the eddy current sensor 115 in the direction of arrow A. Although only one eddy current sensor 115 is shown, alternative configurations, including multiple eddy current sensors, may be configured to monitor the health of rotating machinery or other devices without deviating from the scope and spirit of the present invention. In certain embodiments, multiple sensors 115 may be employed for redundancy or other system design features. The eddy current sensor 115 may be driven by electronics in the sensor electronic module 125. Although in the embodiment described includes an active eddy current sensor with driven magnetic field, the standoff sensor 115 may be implemented with other sensors, including active and passive.

Figure 2:
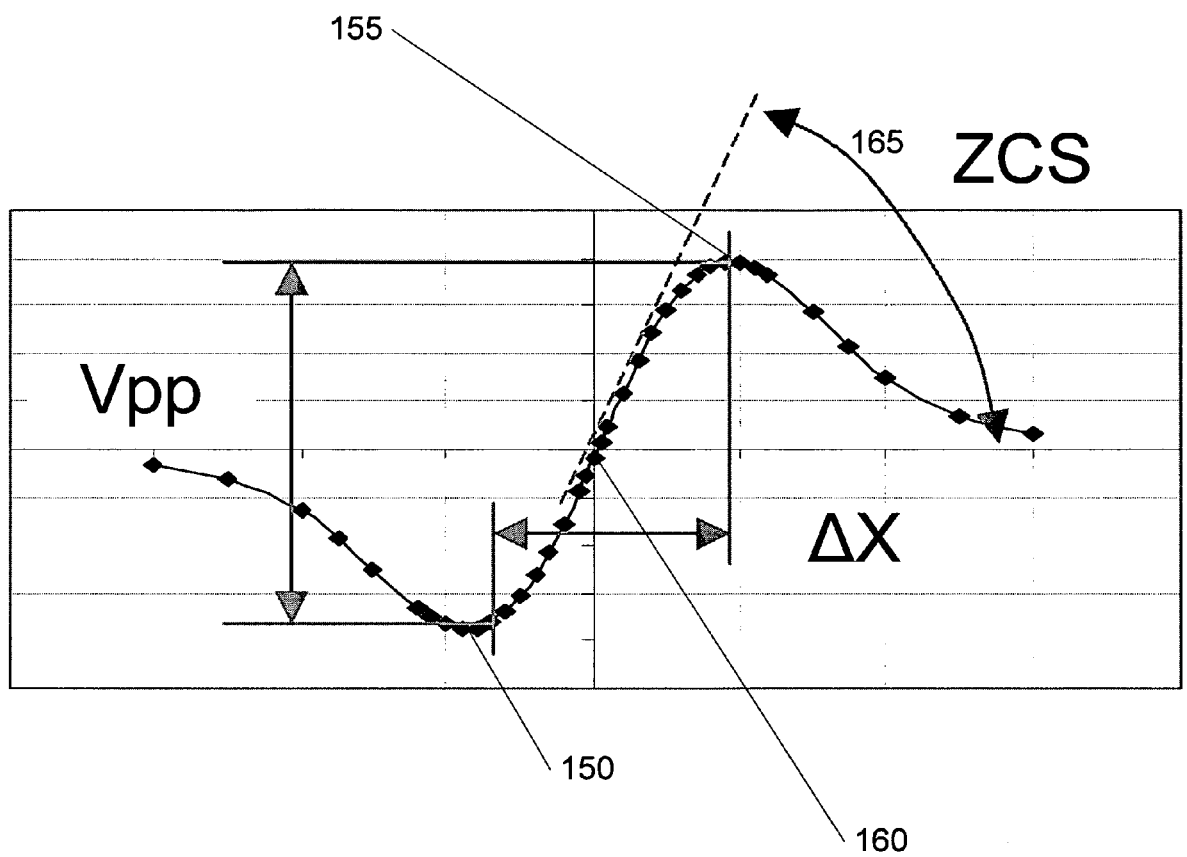
FIG. 2 illustrates a single demodulated waveform signal in accordance with one embodiment of the present invention.

The sensor 115 may generate a signal in response to the conductive element 110 passing the eddy current sensor 115 in the direction of arrow A. The sensor electronic module 125 may receive the generated signal and may be configured to demodulate and amplify the signal for further processing by the defect monitoring module 120. The demodulated signal leaving the sensor electronic module 125 may resemble a waveform as shown in FIG. 2. As discussed below, the defect monitoring module 120 may be configured to process the waveform signal, received from the sensor electronic module 125, to determine the value of the standoff distance. As such, the defect monitoring module 120 may be configured to monitor and/or execute diagnostic routines for aircraft turbine blades or other rotating machine.

Referring to FIG. 2, a waveform signal that has been demodulated by the sensor electronic module 125 is shown. The signal is shown plotted with the horizontal axis representing the position of the conductive element in the x direction shown in FIG. 1 and the vertical axis representing the demodulated voltage signal from the sensor electronic module 125. The waveform signal includes a first voltage or peak 150 and a second voltage or peak 155 and a zero crossing point of 160. The vertical distance between the first peak 150 and the second peak 155 may be considered the peak to peak voltage (Vpp). The horizontal distance (ΔX) of FIG. 2 between the first peak 150 and the second peak 155 may be considered distance the conductive element 110 traveled between where the eddy current sensor 115 recorded the first peak 150 and the second peak 155. A zero crossing slope (ZnS) 165 may also be determined from the demodulated signal as shown.

Contrary to the prior art, which determines the value of the standoff distance as a function of the peak to peak voltage, one embodiment of the present invention includes the defect monitoring module 120 determining the standoff distance as a function of the distance (ΔX). Although magnitude of the waveform and the peak to peak voltage varies with temperature, the distance (ΔX) may be substantially independent of the temperature of the eddy current sensor 115, the conductive element 110, and the sensor electronic module 125 as is discussed in greater detail below. As would be apparent to one of ordinary skill in the art, the demodulated signal shown in FIG. 2 may be flipped or mirrored, such that the first peak is positive, or may vary in shape and size without deviating from the scope and spirit of the present invention. It should also be understood that the data plotted on the horizontal and vertical axis shown in FIG. 2 may be changed or inverted such that (ΔX) may be plotted on the vertical axis and voltage may be plotted on the horizontal axis. As would be apparent to one of skill in the art, the sensor electronic module 125 and the defect monitoring module 120 may be combined into a single set of electronics or may be accomplished by separate electronic devices.

It should be understood that during calibration or testing of the eddy current sensor as shown in FIG. 1, the waveform signal is generated in a spatial domain with the horizontal axis representing the location of the conductive element along the X axis shown in FIG. 1. However, in some embodiments, such as in a turbine blade aircraft engine, the precise location of the tip of the turbine blade may not be easily obtained as the tip passes the eddy current sensor. As such, another embodiment of the present invention includes generating the waveform signal in FIG. 2 in a time domain where the horizontal axis represents time. However, as would be apparent to one of ordinary skill, a waveform signal in the time domain may be converted to a waveform signal in the spatial domain using the velocity of the tip of the conductive element as it passes the eddy current sensor. It should be understood that the velocity of the tip of the conductive element may be determined from the generated waveform and knowledge of the radius of the conductive element. Also, the velocity could be measured by other means known to those of skill in the art in alternative embodiments of the present invention.

Figure 3:
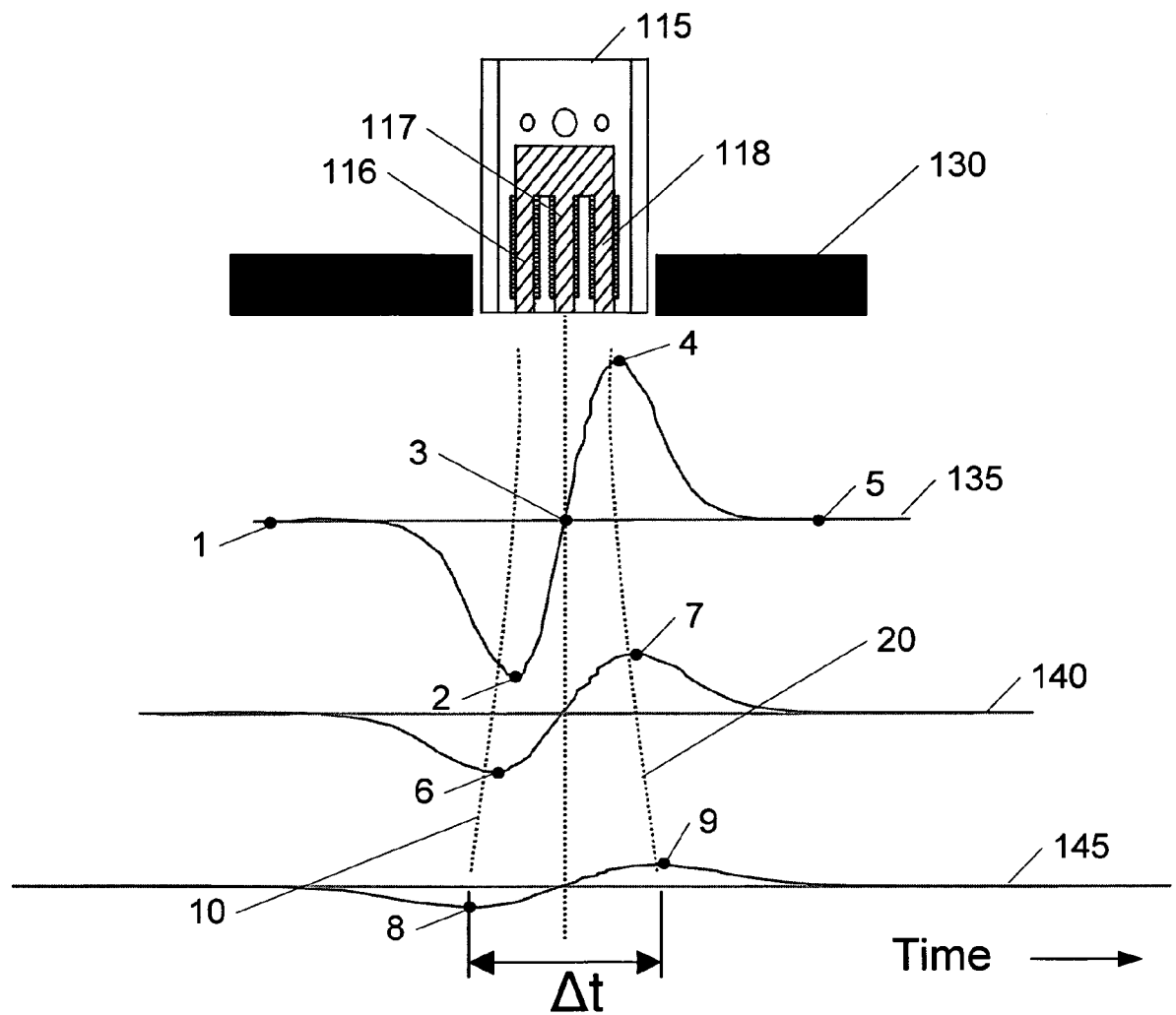
FIG. 3 illustrates three demodulated waveforms associated with different standoff distances in accordance with another embodiment of the present invention.

Referring to FIG. 3, three demodulated waveform signals are shown representing the signals of conductive elements passing the eddy current sensor 115 at three different standoff distances 135, 140, and 145. The standoff distances 135, 140, and 145 represent the distance from the eddy current sensor 115 that the tip of a conductive element, such as a turbine blade may pass. The waveform signals associated with each of the standoff distances shows the change in waveform signal with a change in the standoff distance.

One embodiment of the present invention is shown in FIG. 3 with the eddy current sensor 115 mounted in an opening in a engine casing 130 such the eddy current sensor 115 may sense the passage of the conductive elements or rotating turbine blades (not shown in FIG. 3). It should also be noted that the demodulated signals as shown in FIG. 3 are plotted in the time domain.

Referring to the waveform signal associated with the standoff distance 135, the conductive element (not shown) generates the waveform signal including the points 1, 2, 3, 4, and 5. Point 1 shows no signal being generated by the eddy current sensor 115 because the conductive element is beyond the reach of the sensor 115. Point 2 shows that the conductive element is passing near a first side coil 116. As the conductive element passes, point 3 shows the location where the conductive element is aligned with a central coil 117, which in some embodiments may be the sensing coil. Point 4 shows the conductive element is passing near a second side coil 118. The two side coils may be configured as drive coils in accordance with one embodiment of the present invention. Finally, point 5 shows no signal being generated by the eddy current sensor 115 because the conductive element has passed beyond the sensitivity of the eddy current sensor. It should also be understood that the drive coils and/or the sensing coils may be alternatively positioned without deviating from the scope and spirit of the present invention.

As discussed with reference to FIG. 2, point 2 corresponds to the first peak voltage 150, point 4 corresponds to the second peak voltage 155, and point 3 corresponds to the zero crossing point 160. However, instead of the distance (ΔX) between the first and second peaks, FIG. 3 shows that a time interval (Δt) has passed between the first peak voltage (point 2) and the second peak voltage (point 4). The peak to peak voltage Vpp Is shown for the waveform associated with the standoff distance 135.

Referring to the waveform signal associated with the greater standoff distance 140, the waveform signal is shown with a smaller amplitude and with further spaced apart first and second voltage peaks. In other words, the maximum values for the first peak voltage (point 6) and the second peak voltage (point 7) are less that the corresponding peaks associated with the standoff distance 135. Further, the time interval (Δt) between points 6 and 7 is greater than the timer interval (Δt) between the points 2 and 4.

Referring to the waveform signal associated with the even greater standoff distance 145, the waveform signal is shown with an even smaller amplitude and with further spaced apart first and second voltage peaks. In other words, the maximum values for the first peak voltage (point 8) and the second peak voltage (point 9) are less that the corresponding peaks associated with the standoff distance 140. Further, the time interval (Δt) between points 8 and 9 is greater than the timer interval (Δt) between the points 2 and 4 and points 6 and 7. As illustrated in FIG. 3, the waveform may be considered to be spreading and decaying as standoff distance increases.

As shown in FIG. 3, the peak to peak voltage Vpp Varies with the standoff distance and as shown, decreases as the size of the standoff distance increases. In accordance with the prior art, this correlation between the Vpp And the standoff distance has been used to determine the standoff distance by analyzing the Vpp of the demodulated waveform signals generated by the eddy current sensor.

However, FIG. 3 also shows lines 10 and 20 which trace the times of the first peak voltage and second peak voltage respectively. Line 10 traces the time occurrences of the negative voltage peaks (points 2, 6, and 8) and indicates that as the standoff distance increases the line 10 migrates to the left. Line 20 traces the time occurrences of the positive voltage peaks (points 4, 7, and 9) and indicates that as the standoff distance increases the line 20 migrates to the right. As such, as the standoff distance increases, the time interval (Δt) between the first peak voltage and the second peak voltage increases. In accordance with one embodiment of the present invention, the correlation between the time interval (Δt) and the standoff distance may be used to determine the standoff distance from a give waveform signal.

It should be noted that by other characteristics of the waveform signals shown in FIG. 3 may be used to gather additional information. For example, point 3 of the waveform signals, where the signal crosses the zero axis. This zero crossing may be used to determine the arrival time of the conductive elements. As would be understood by one of skill in the art, the zero crossing slope may be considered in determining the accuracy of the time of arrival, for example, the steeper the zero crossing slope, the more accurate the determination of the time of arrival. In one embodiment, the time of arrival of each of the turbine blades may be used to determine the tip velocity of the blades as they pass the eddy current sensor 115 or the average velocity may be determined using data collected from all of the blades or other conductive elements.

As discussed above with reference to the prior art, the Vpp Between points 2 and 4 in FIG. 3 is dependent on the temperature of the eddy current sensor 115 and the sensor electronics used to run the eddy current sensor. As such, the standoff distance as a function of Vpp Is also a function of the temperature of the eddy current sensor and sensor electronics. However, in accordance with the present invention, the standoff distance as a function of the time interval (Δt) between points 2 and 4 is substantially independent of the temperature of the eddy current sensor 115 and the sensor electronics.

Figure 4:
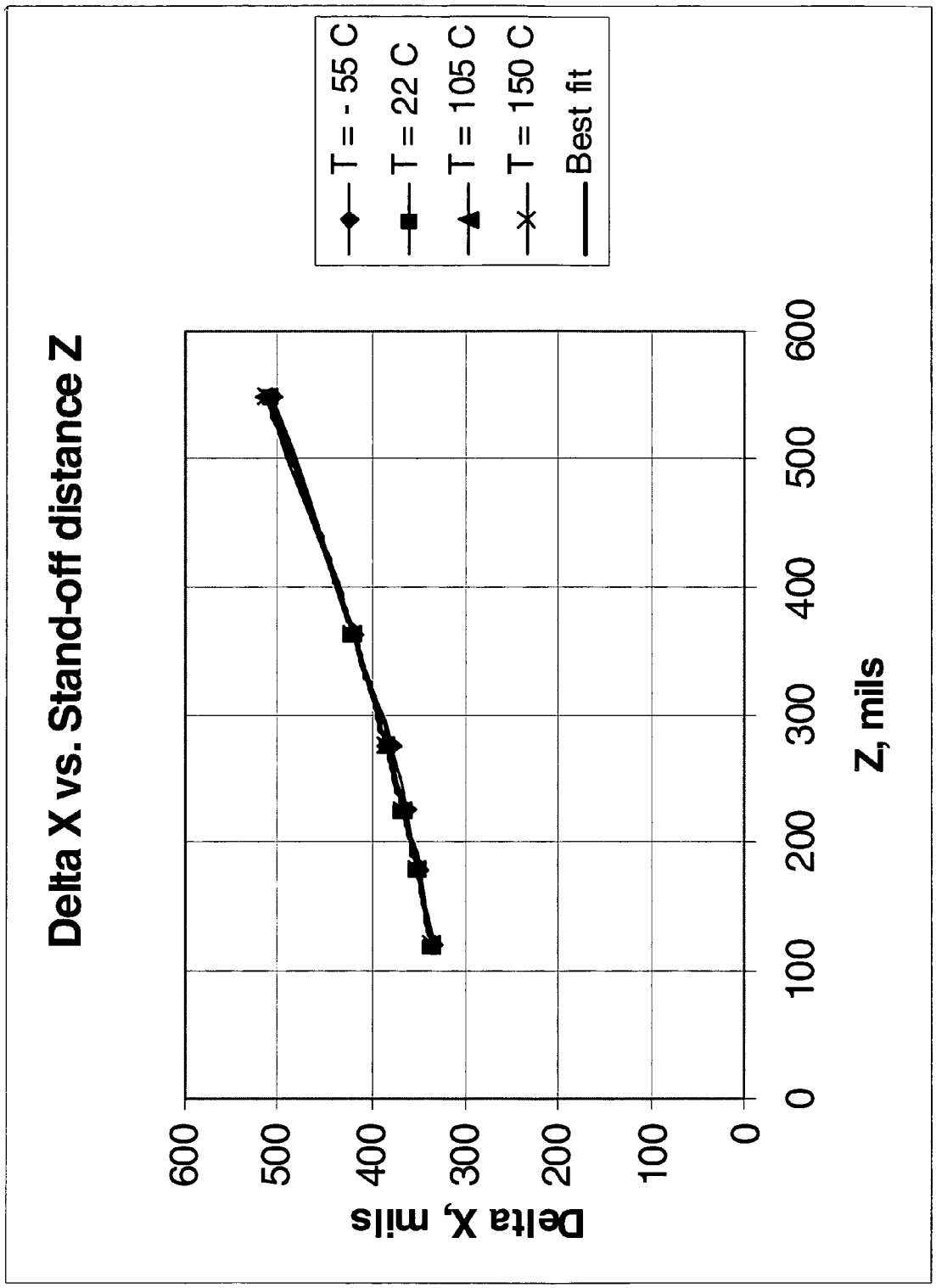
FIG. 4 illustrates a calibration curve in accordance with another embodiment of the present invention.

Referring to FIG. 4, a graph of the distance (ΔX) versus the standoff distance is shown plotted for various temperatures. The graph is plotted in the spatial domain with the distance (ΔX) in reference to the x direction shown in FIG. 1 and the plot of the waveform signal shown in FIG. 2. The standoff distance as plotted corresponds to the z direction as shown in FIG. 1. Further, the graph illustrates test data of standoff distance as a function of the distance (ΔX) at four various temperatures of the eddy current sensor: −55C, 22C, 105C, and 150C. Although the temperature data shown in FIG. 4 refers to the temperature of the eddy current sensor only, the standoff distance, as a function of (ΔX), may also be independent of the temperature of the sensor electronics. As with the temperature of the eddy current sensor, the temperature of the sensor electronics may affect the magnitude of the waveform and the peak-to-peak voltage but may not influence the distance (ΔX).

Referring again to FIG. 4, a best fit curve or calibration curve is also plotted on the graph. As demonstrated by the graph, the distance (ΔX) may be considered a temperature-independent parameter of the waveform signal and the standoff distance, as a function of the distance (ΔX), may be substantially independent of temperature. The best fit curve plotted in FIG. 4 may be used graphically or in equation form in order to determine the standoff distance from the distance (ΔX).

In accordance with at least one embodiment of the present invention, the standoff distances of turbine blades passing an eddy current sensor may be determined as a function of the distance (ΔX) without the need to measure the temperature of certain components and compensate for the temperature effects on the waveform signal. Further, the best fit curve or calibration curve as an equation or as a graphical determination may be used to determine the standoff distance from a measured waveform and the distance (ΔX).

Figure 5:
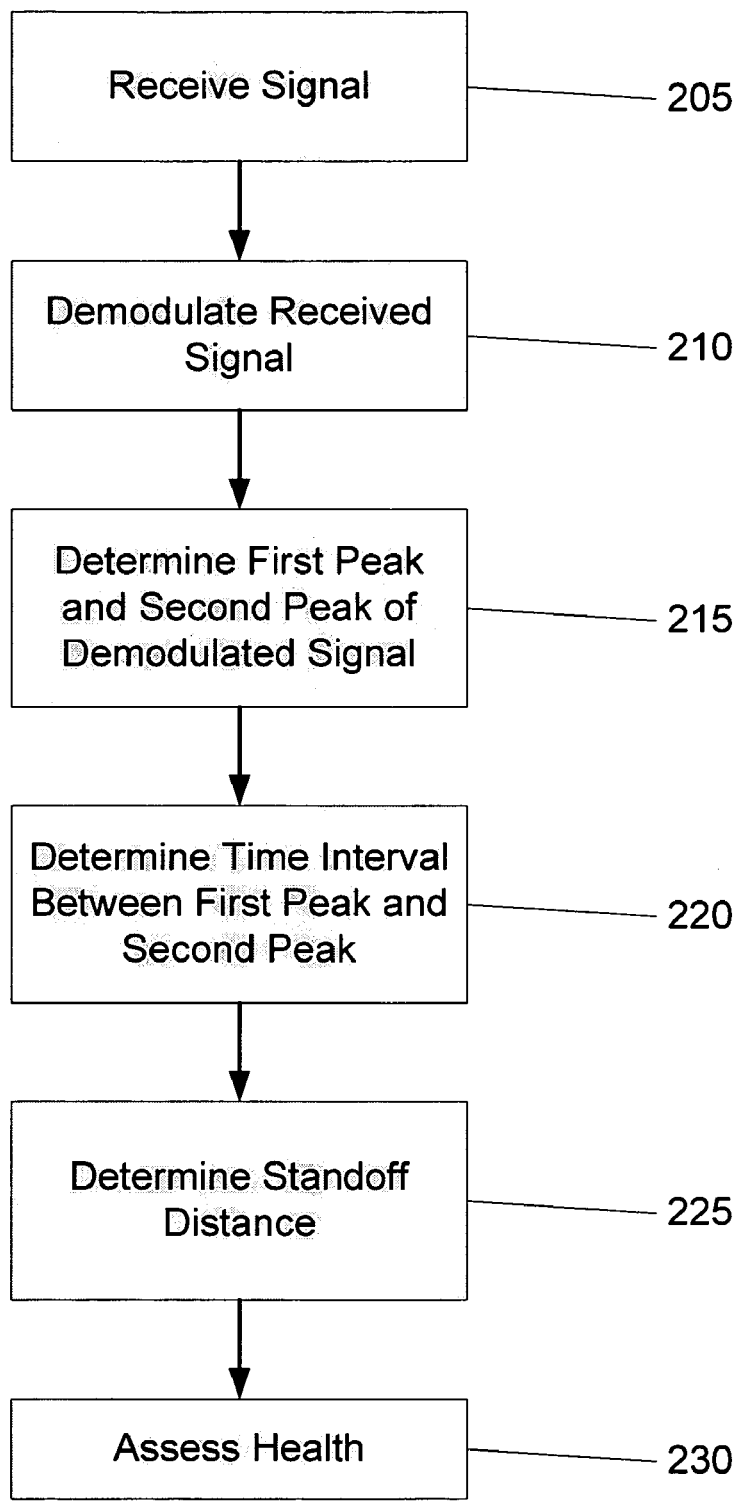
FIG. 5 illustrates a flow diagram of the system in accordance with another embodiment of the present invention.

FIG. 5 illustrates a flow diagram 200 which may be utilized by the sensor electronic module 125 and the defect monitoring module 120 in accordance with an embodiment of the invention. It should be readily apparent to those of ordinary skill in the art that the flow diagram 200 depicted in FIG. 5 represents a generalized method and that other steps may be added or existing steps may be removed or modified. Further, it should be understood that the electronic modules 120 and 125 may combined into a single unit or divided to perform different functions without deviating from the scope and spirit of the present invention.

As shown in FIG. 5 and discussed above, the sensor electronic module 125 may be configured to receive a signal from the sensor 115 in step 205. The sensor electronic module 125 may also be configured to continuously sample the signal from the sensor 115 or record the signal entirely before forwarding the signal the defect monitoring module 120. In one embodiment, the sensor electronic module 120 may apply digital sampling of the eddy current sensor signal or may use analog techniques to collect and forward the signal. As would be apparent to those of skill in the art, in a digital embodiment of the present invention, analog to digital conversion may be accomplished at various points in the method.

In step 210, the sensor electronic module 120 may be configured to demodulate the received signal using a demodulator. In some embodiments, the demodulated signal represents a baseband component of a blade waveform produced by the turbine blade of an aircraft engine or another rotary machine. This blade waveform may be illustrated in detail in FIG. 3. The demodulated signal or waveform may then by provided to the defect monitoring module for further processing.

The defect monitoring module 120 may be configured to analyze the waveform signal and determine a first peak voltage and a second peak voltage in waveform signal, in step 215. As would be apparent to those of skill in the art, the determination of the first peak voltage and the second peak voltage may be accomplished by employing software to analyze the waveform signal.

In step 220, the defect monitoring module 120 may also be configured to determine the time interval (Δt) between the first and second peak voltages using software analysis. More particularly, the defect monitoring system 115 may take the difference between the time values of the first and second voltage peaks. Due to the calibration of the eddy current sensor being accomplished in the spatial domain, the time interval (Δt) may be converted into the distance (ΔX) as discussed above using a conversion equation. In one embodiment of the present invention, the time interval (Δt) for a turbine blade may be converted into the distance (ΔX) using the following equation:

$$\Delta X = \Delta t \cdot V_{tip} \cdot \sin(\phi) \quad (1)$$

Where Δt is the time interval between the voltage peaks; $V_{tip}$ is the linear velocity of the monitored rotating element, e.g., a blade tip of an engine; and φ is the blade pitch angle (angle between the blade tip chord and the plane of rotation). In some embodiments, $V_{tip}$ may be determined from the averaged time intervals between blade arrival times, number of blades, and blade radius in the rotating machine 110. However, the $V_{tip}$ may be measured using various methods known to those of skill in the art.

In step 225, the defect monitoring module 120 may be configured to determine the standoff distance as a function of the distance ($\Delta X$). More particularly, the defect monitoring system may use a best fit curve or calibration curve to determine the standoff distance. An example of a calibration curve is shown in FIG. 4. As a practical matter, the data from the calibration curve may be maintained in a look-up table. The defect monitoring system 120 may use a look up function to determine the standoff distance from the peak-to-peak distance. In embodiments where memory space is limited, a limited version of the look-up table may be used. For values that fall between stored data points, interpolation techniques may be used to determine the standoff value for a given ($\Delta X$), the peak-to-peak distance. Other methods of determining the standoff distance as a function of the distance ($\Delta X$) may be employed without deviating from the scope and spirit of the present invention.

It should also be apparent to those of skill in the art that calibration curves and test data may be developed to correlate the standoff distance directly to the time interval ($\Delta t$) for specific embodiments of the present invention.

In step 230, the defect monitoring module 120 may compare and analyze the determined value of the standoff distance to gather health data on the conductive element associated with the standoff distance. More particularly, the difference in various standoff distance between different conductive elements or between the same conductive element may be analyzed to determine certain health characteristics. For example, a change in the standoff distance over time for a specific turbine blade in an aircraft engine may indicate that the turbine blade is suffering from fatigue and may fail if not replaced. In other embodiments, in the event a standoff distance reading falls outside a predetermined range, the defect monitoring module may signal to a pilot or a flight engineer that a flaw has initiated in a turbine blade.

It should be understood that the defect monitoring module 120 may be configured to monitor the health a rotating machine, such as an aircraft engine, in real time and notify systems engineers and pilots in the event that a possible defect is determined from the standoff distances. In other embodiments, the standoff distance values may be recorded by the defect monitoring module 120 and stored until the data may be analyzed afterward, for example, after an aircraft flight. As such, system operators may analyze the recorded standoff distance data to assess any defect in the engine and may require necessary repairs.

The use of the distance ($\Delta X$), or the time interval ($\Delta t$), as a substantially temperature-independent parameter for determining the standoff distance functions to simplify the hardware and software of a health monitoring system as compared to conventional methods of determining standoff distances. The present invention may not require the additional temperature probes or sensors to monitor changes in the temperature of the sensors and electronics. Further, the additional computing hardware and software may not be required to perform the complex temperature compensation algorithms needed to do temperature compensation. For example, additional hardware and software are required to perform the complex mathematical models simulating the eddy current sensor system temperature behavior. Additionally, the effort and cost of testing and developing calibration data and simulation data to be used in practice may be significantly reduced when using the embodiments of the present invention.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

The invention claimed is:

1. A temperature-independent method of determining a standoff distance using an eddy current sensor, the method comprising:
   receiving a signal from the eddy current sensor in response to a conductive element moving past the eddy current sensor;
   generating a waveform from the signal, the waveform having a first point corresponding to a first voltage and second point corresponding to a second voltage;
   determining at least one waveform parameter from the waveform, the at least one waveform parameter being substantially independent of an eddy current sensor temperature; and
   determining the standoff distance based on the at least one waveform parameter, the standoff distance defining a distance between the eddy current sensor and conductive element, wherein the step of determining the standoff distance includes determining the standoff distance from the time interval between the first point and the second point.

2. The method according to claim 1, wherein the step of determining at least one waveform parameter includes:
   identifying in the waveform the first point and the second point; and
   determining a time interval between the first point and the second point, the time interval between the first point and the second point being substantially independent of the eddy current sensor temperature.

3. The method according to claim 2, wherein the time interval between the first point and the second point being substantially independent of the eddy current sensor electronics temperature.

4. The method according to claim 1, wherein the step of determining the standoff distance from the time interval includes using a calibration curve.

5. The method according to claim 4, further comprising the step of assessing a mechanical status of the conductive element based on the standoff distance.

6. The method according to claim 1, further comprising the steps of:
   determining a velocity of the conductive element; and
   converting the time interval into a spatial distance using the velocity of the conductive element.

7. The method according to claim 1, wherein the step of generating the waveform includes demodulating the signal to produce the waveform.

8. A method of monitoring the health of a rotating machine using an eddy current sensor, the method comprising the steps of:
   receiving a sensor signal from the eddy current sensor in response to a rotating element of the rotating machine;
   generating a waveform signal from the sensor signal, the waveform signal having a first point corresponding to a first voltage and a second point corresponding to a second voltage;
   determining at least one waveform parameter from the waveform signal, the at least one waveform parameter being substantially independent of an eddy current sensor and electronics temperature;

determining a standoff distance based on the at least one waveform parameter, the standoff distance defining a distance between the eddy current sensor and the rotating element of the rotating machine; and determining a health status of the rotating machine based on the standoff distance, wherein the step of determining the standoff distance includes determining the standoff distance from the time interval between the first point and the second point.

9. The method according to claim 8, wherein the step of determining at least one waveform parameter includes:

identifying in the waveform signal the first point and the second point; and determining a time interval between the first point and the second point, the time interval between the first point and the second point being substantially independent of the eddy current sensor temperature.

10. The method according to claim 9, wherein the time interval between the first point and the second point being substantially independent of the eddy current sensor electronics temperature.

11. The method according to claim 8, wherein the step determining the standoff distance from the time interval includes using a calibration curve.

12. The method according to claim 11, further comprising the steps of:

determining a velocity of the conductive element; and converting the time interval into a spatial distance using velocity of the conductive element.

13. The method according to claim 8, wherein the step of generating the waveform signal includes demodulating the signal to produce the waveform signal.

14. A system for monitoring the health of an aircraft engine, the engine includes a plurality of blades, the system comprising:

an eddy current sensor attached to the engine, the eddy current sensor configured to generate a sensor signal for each of the plurality of blades;

an eddy current sensor electronic module configured to receive the sensor signal and generate a waveform signal from the sensor signal, the waveform signal having a first point corresponding to a first voltage and a second point corresponding to a second voltage; and a defect monitoring module configured to receive the waveform signal from the eddy current sensor electronic module and determine a waveform parameter, the waveform parameter being substantially independent of an eddy current sensor temperature, the defect monitoring module further configured to determine a standoff distance from the waveform parameter, the standoff distance defined by a distance between the eddy current sensor and each of the plurality of blades, wherein the standoff distance is determined from the time interval between the first point and the second point.

15. The system according to claim 14, wherein the defect monitoring module is further configured to assess the health of the engine based on the set of stand-off distances in real time.

16. The system according to claim 14, wherein the defect monitoring module is further configured to store the standoff distance for subsequent analysis of the health of the engine.

17. The system according to claim 14, wherein the defect monitoring module is further configured to identify in the waveform signal the first point and the second point and determine a time interval between the first point and the second point, the time interval being substantially independent of the eddy current sensor temperature.

18. The system according to claim 17, wherein the time interval being substantially independent of the eddy current sensor electronics temperature.

19. The system according to claim 14, wherein the standoff distance is determined from the time interval using a calibration curve.

20. The system according to claim 19, wherein the defect monitoring module is further configured to convert the time interval into a spatial distance using a velocity of the plurality of blades.

21. The system according to claim 20, wherein the defect monitoring module uses a time of arrival to determine the velocity of the plurality of blades, the time of arrival being determined from the waveform signal.

22. The system according to claim 20, further comprising a velocity sensor configured to sense the velocity of each of the plurality of blades and provide a velocity signal to the defect monitoring module.

23. The system according to claim 14, wherein the eddy current sensor electronic module demodulates the sensor signal to produce the waveform signal.

* * * * *